(12) United States Patent
Bhakta et al.

(10) Patent No.: US 12,442,966 B2
(45) Date of Patent: Oct. 14, 2025

(54) OPTICAL SYSTEMS FOR PROVIDING POLARIZED LIGHT TO A WAVEGUIDE

(71) Applicant: Apple Inc., Cupertino, CA (US)

(72) Inventors: Vikrant Bhakta, Santa Clara, CA (US); Guolin Peng, Sunnyvale, CA (US); Hyungryul Choi, San Jose, CA (US); Scott M. DeLapp, San Diego, CA (US)

( * ) Notice: Subject to any disclaimer, the term of this patent is extended or adjusted under 35 U.S.C. 154(b) by 294 days.

(21) Appl. No.: 18/188,322

(22) Filed: Mar. 22, 2023

(65) Prior Publication Data

US 2023/0333302 A1  Oct. 19, 2023

Related U.S. Application Data

(63) Continuation of application No. PCT/US2021/054499, filed on Oct. 12, 2021.

(60) Provisional application No. 63/092,112, filed on Oct. 15, 2020.

(51) Int. Cl.
| | |
|---|---|
| *F21V 8/00* | (2006.01) |
| *G02B 5/30* | (2006.01) |
| *G02B 5/32* | (2006.01) |
| *G02B 27/28* | (2006.01) |

(52) U.S. Cl.
CPC ......... *G02B 6/0016* (2013.01); *G02B 5/3083* (2013.01); *G02B 5/32* (2013.01); *G02B 6/0031* (2013.01); *G02B 6/0035* (2013.01); *G02B 27/283* (2013.01)

(58) Field of Classification Search
CPC ....... G02B 6/0016; G02B 5/3083; G02B 5/32
USPC .......................................................... 359/896
See application file for complete search history.

(56) References Cited

U.S. PATENT DOCUMENTS

| | | | |
|---|---|---|---|
| 6,982,830 B2 | 1/2006 | Li | |
| 7,418,170 B2 | 8/2008 | Mukawa et al. | |
| 8,903,207 B1 | 12/2014 | Brown et al. | |
| 9,013,793 B2 | 4/2015 | Gupta et al. | |
| 9,075,184 B2 | 7/2015 | Popovich et al. | |
| 9,341,846 B2 | 5/2016 | Popovich et al. | |
| 9,456,744 B2 | 10/2016 | Popovich et al. | |
| 9,971,150 B1* | 5/2018 | Robbins | G02B 27/0018 |
| 10,473,933 B2 | 11/2019 | Wall et al. | |
| 11,119,322 B2* | 9/2021 | Guan | G02B 27/0172 |

(Continued)

FOREIGN PATENT DOCUMENTS

CN   104656259 B   4/2017

*Primary Examiner* — Allyson N Trail
(74) *Attorney, Agent, or Firm* — Treyz Law Group, P.C.; Michael H. Lyons

(57) ABSTRACT

A display may include a waveguide for providing light to an eye box. The display may include polarization recycling structures having a polarizing beam splitter and a prism. The polarizing beam splitter may transmit a first portion of unpolarized light as first image light having a first polarization and may reflect a second portion of the unpolarized light as second image light having a second polarization. One or more waveplates may be mounted to the prism for transmitting the second image light. Upon transmission by the waveplate(s), the second image light may have the same polarization as the first image light. An input coupler may couple the first and second image light into the waveguide. Providing polarized light to the waveguide may maximize the optical efficiency of the waveguide. The polarization recycling structures may maximize the amount of the image light that is coupled into the waveguide.

23 Claims, 6 Drawing Sheets

(56) References Cited

U.S. PATENT DOCUMENTS

| | | | |
|---|---|---|---|
| 12,313,936 B1* | 5/2025 | Strandborg | G02B 30/33 |
| 2009/0052046 A1 | 2/2009 | Amitai | |
| 2012/0194550 A1* | 8/2012 | Osterhout | G06F 1/163 |
| | | | 345/633 |
| 2014/0104665 A1 | 4/2014 | Popovich et al. | |
| 2014/0140654 A1 | 5/2014 | Brown et al. | |
| 2017/0031160 A1 | 2/2017 | Popovich et al. | |
| 2017/0276940 A1 | 9/2017 | Popovich et al. | |
| 2020/0004022 A1* | 1/2020 | Park | G02B 27/0176 |
| 2020/0159030 A1 | 5/2020 | Ayres et al. | |
| 2021/0364799 A1* | 11/2021 | Guo | G02B 27/1013 |
| 2022/0004009 A1* | 1/2022 | Myhre | G02B 27/0172 |
| 2022/0373807 A1* | 11/2022 | Danziger | G02B 26/101 |
| 2023/0305217 A1* | 9/2023 | Tan | G02B 6/0055 |

\* cited by examiner

OPTICAL SYSTEMS FOR PROVIDING POLARIZED LIGHT TO A WAVEGUIDE

This application is a continuation of International Patent Application No. PCT/US2021/054499, filed Oct. 12, 2021, which claims priority to U.S. Provisional Patent Application No. 63/092,112, filed Oct. 15, 2020, which are hereby incorporated by reference herein in their entireties.

BACKGROUND

This relates generally to optical systems and, more particularly, to optical systems for displays.

Electronic devices may include displays that present images to a user's eyes. For example, devices such as virtual reality and augmented reality headsets may include displays with optical elements that allow users to view the displays.

It can be challenging to design devices such as these. If care is not taken, the components used in displaying content may be unsightly and bulky and may not exhibit desired levels of optical performance.

SUMMARY

An electronic device such as a head-mounted device may have one or more near-eye displays that produce images for a user. The displays may include a display module and a waveguide. The waveguide may have an input coupler and an output coupler. The input coupler may be a reflective input coupling prism or a transmissive input coupling prism, as examples. The display module may produce unpolarized image light.

Polarization recycling structures may be optically interposed between the display module and the waveguide. The polarization recycling structures may include a polarizing beam splitter and a prism coupled to the polarizing beam splitter. The polarizing beam splitter may transmit a first portion of the unpolarized light as first image light having a first linear polarization. The polarizing beam splitter may reflect a second portion of the unpolarized light as second image light having a second linear polarization. One or more waveplates may be mounted to the prism for transmitting the second image light. The one or more waveplates may include a half waveplate or a pair of quarter waveplates. Upon transmission by the one or more waveplates, the second image light may have the same linear polarization as the first image light.

The input coupler may couple the first and second image light into the waveguide. The output coupler may couple the first and second image light out of the waveguide and towards the eye box. Providing linearly polarized light to the waveguide may maximize the optical efficiency of the waveguide while also minimizing the production of light saber artifacts. The polarization recycling structures may maximize the amount of the unpolarized image light that is coupled into the waveguide and thus provided to the eye box.

DETAILED DESCRIPTION

Figure 1:
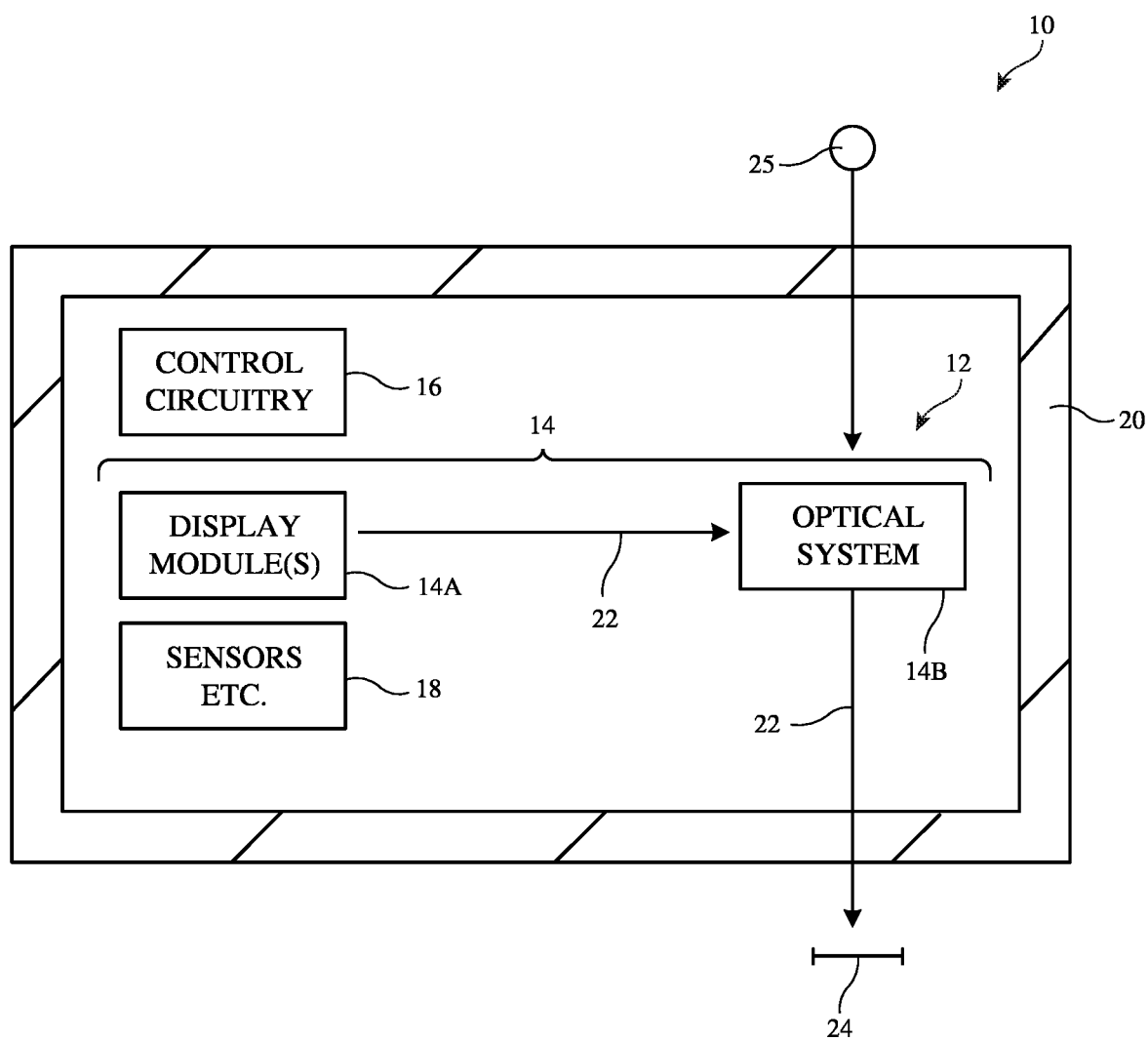
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 14 mounted within support structure (housing) 20. Support structure 20 may have the shape of a pair of eyeglasses (e.g., supporting frames), may form a housing having a helmet shape, or may have other configurations to help in mounting and securing the components of near-eye displays 14 on the head or near the eye of a user. Near-eye displays 14 may include one or more display modules such as display modules 14A and one or more optical systems such as optical systems 14B. Display modules 14A may be mounted in a support structure such as support structure 20. Each display module 14A may emit light 22 (sometimes referred to herein as image light 22) that is redirected towards a user's eyes at eye box 24 using an associated one of optical systems 14B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code (instructions) may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.). In one suitable arrangement that is sometimes described herein as an example, components 18 may include gaze tracking sensors that gather gaze image data from a user's eye at eye box 24 to track the direction of the user's gaze in real time. As an example, the gaze tracking sensors may include infrared or other light emitters that emit infrared light or other light towards the eye box and image sensors that sense the infrared or other light reflected off of the user's eye (e.g., where the sensed light identifies the gaze direction of the user's eye).

Display modules 14A (sometimes referred to herein as display engines 14A, light engines 14A, or projectors 14A) may include reflective displays (e.g., displays having arrays of light sources that produce illumination light that reflect off of a reflective display panel to produce image light such as liquid crystal on silicon (LCOS) displays, digital-micromirror device (DMD) displays, or other spatial light modulators), emissive displays (e.g., micro-light-emitting diode (uLED) displays, organic light-emitting diode (OLED) displays, laser-based displays, etc.), or displays of other types. Light sources in display modules 14A may include uLEDs, OLEDs, LEDs, lasers, combinations of these, or any other desired light-emitting components.

Optical systems 14B may form lenses that allow a viewer (see, e.g., a viewer's eyes at eye box 24) to view images on display(s) 14. There may be two optical systems 14B (e.g., for forming left and right lenses) associated with respective left and right eyes of the user. A single display 14 may produce images for both eyes or a pair of displays 14 may be used to display images. In configurations with multiple displays (e.g., left and right eye displays), the focal length and positions of the lenses formed by components in optical system 14B may be selected so that any gap present between the displays will not be visible to a user (e.g., so that the images of the left and right displays overlap or merge seamlessly).

If desired, optical system 14B may contain components (e.g., an optical combiner, etc.) to allow real-world image light from real-world images or objects 25 to be combined optically with virtual (computer-generated) images such as virtual images in image light 22. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement in which a camera captures real-world images of object 25 and this content is digitally merged with virtual content at optical system 14B).

System 10 may, if desired, include wireless circuitry and/or other circuitry to support communications with a computer or other external equipment (e.g., a computer that supplies display 14 with image content). During operation, control circuitry 16 may supply image content to display 14. The content may be remotely received (e.g., from a computer or other content source coupled to system 10) and/or may be generated by control circuitry 16 (e.g., text, other computer-generated content, etc.). The content that is supplied to display 14 by control circuitry 16 may be viewed by a viewer at eye box 24.

Figure 2:
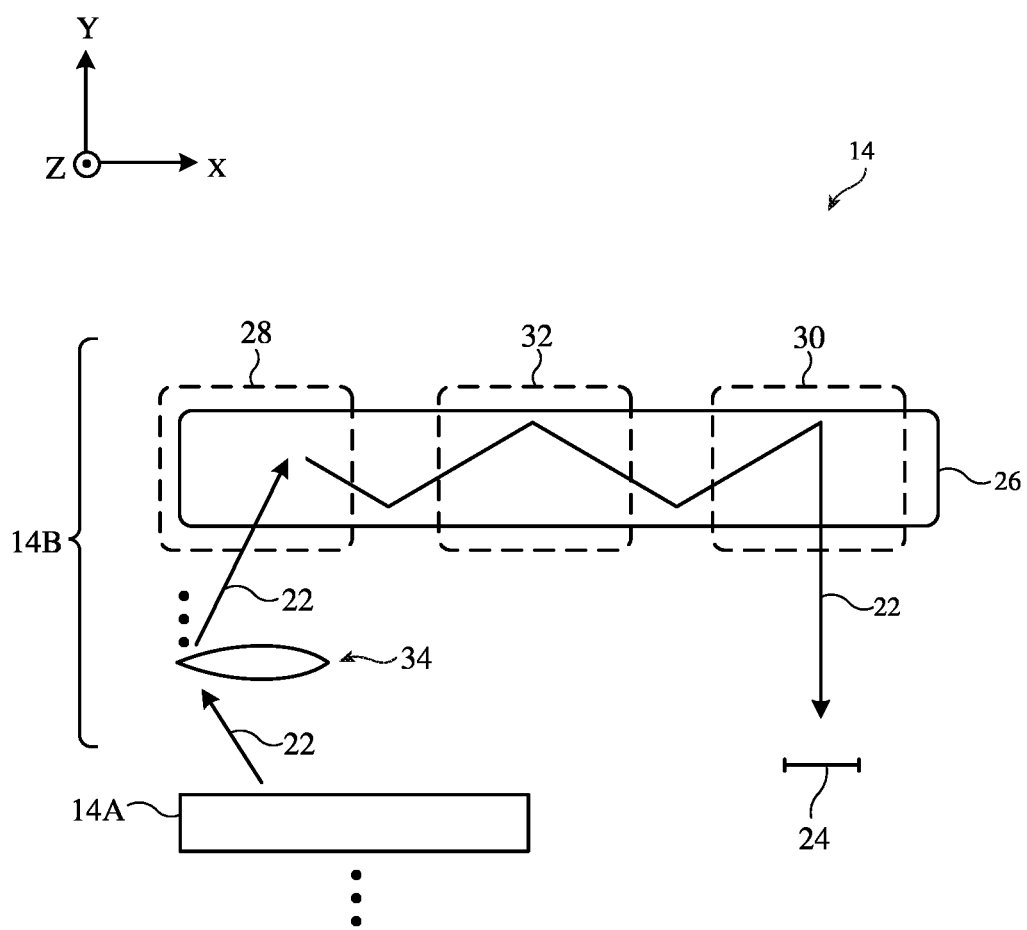
FIG. 2 is a top view of an illustrative optical system for a display having a waveguide with an input coupler in accordance with some embodiments.

FIG. 2 is a top view of an illustrative display 14 that may be used in system 10 of FIG. 1. As shown in FIG. 2, near-eye display 14 may include one or more display modules such as display module(s) 14A and an optical system such as optical system 14B. Optical system 14B may include optical elements such as one or more waveguides 26. Waveguide 26 may include one or more stacked substrates (e.g., stacked planar and/or curved layers sometimes referred to herein as waveguide substrates) of optically transparent material such as plastic, polymer, glass, etc.

If desired, waveguide 26 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 26 may include holographic phase gratings such as volume holograms or thin-film holograms, meta-gratings, or any other desired diffractive grating structures. The diffractive gratings on waveguide 26 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Optical system 14B may include collimating optics such as collimating lens 34. Collimating lens 34 may include one or more lens elements that help direct image light 22 towards waveguide 26. Collimating lens 34 may be omitted if desired. If desired, display module(s) 14A may be mounted within support structure 20 of FIG. 1 while optical system 14B may be mounted between portions of support structure 20 (e.g., to form a lens that aligns with eye box 24). Other mounting arrangements may be used, if desired.

As shown in FIG. 2, display module(s) 14A may generate image light 22 associated with image content to be displayed to eye box 24. Image light 22 may be collimated using a lens such as collimating lens 34. Optical system 14B may be used to present image light 22 output from display module(s) 14A to eye box 24.

Optical system 14B may include one or more optical couplers such as input coupler 28, cross-coupler 32, and output coupler 30. In the example of FIG. 2, input coupler 28, cross-coupler 32, and output coupler 30 are formed at or on waveguide 26. Input coupler 28, cross-coupler 32, and/or output coupler 30 may be completely embedded within the substrate layers of waveguide 26, may be partially embedded within the substrate layers of waveguide 26, may be mounted to waveguide 26 (e.g., mounted to an exterior surface of waveguide 26), etc.

The example of FIG. 2 is merely illustrative. One or more of these couplers (e.g., cross-coupler 32) may be omitted. Optical system 14B may include multiple waveguides that are laterally and/or vertically stacked with respect to each other. Each waveguide may include one, two, all, or none of couplers 28, 32, and 30. Waveguide 26 may be at least partially curved or bent if desired.

Waveguide 26 may guide image light 22 down its length via total internal reflection. Input coupler 28 may be configured to couple image light 22 from display module(s) 14A into waveguide 26, whereas output coupler 30 may be configured to couple image light 22 from within waveguide 26 to the exterior of waveguide 26 and towards eye box 24. Input coupler 28 may include an input coupling prism and a steering mirror or liquid crystal steering element. As an example, display module(s) 14A may emit image light 22 in direction +Y towards optical system 14B. When image light 22 strikes input coupler 28, input coupler 28 may redirect image light 22 so that the light propagates within waveguide 26 via total internal reflection towards output coupler 30 (e.g., in direction X). When image light 22 strikes output coupler 30, output coupler 30 may redirect image light 22 out of waveguide 26 towards eye box 24 (e.g., back along the Y-axis). In scenarios where cross-coupler 32 is formed at waveguide 26, cross-coupler 32 may redirect image light 22 in one or more directions as it propagates down the length of waveguide 26, for example.

Input coupler 28, cross-coupler 32, and/or output coupler 30 may be based on reflective and refractive optics or may be based on holographic (e.g., diffractive) optics. In arrangements where couplers 28, 30, and 32 are formed from reflective and refractive optics, couplers 28, 30, and 32 may include one or more reflectors (e.g., an array of micromirrors, partial mirrors, louvered mirrors, or other reflectors). In arrangements where couplers 28, 30, and 32 are based on holographic optics, couplers 28, 30, and 32 may include diffractive gratings (e.g., volume holograms, surface relief gratings, etc.).

In one suitable arrangement that is sometimes described herein as an example, output coupler 30 is formed from diffractive gratings embedded within waveguide 26 (e.g., volume holograms recorded on a grating medium stacked between transparent polymer waveguide substrates, an array of micromirrors embedded in a polymer layer interposed between transparent polymer waveguide substrates, etc.), whereas input coupler 28 includes a prism mounted to an exterior surface of waveguide 26 (e.g., an exterior surface defined by a waveguide substrate that contacts the grating medium or the polymer layer used to form output coupler 30). The prism may be a reflective prism or a transmissive prism.

In practice, waveguide 26 may exhibit greater optical efficiency when operating on light of a given linear polarization. For example, holograms in output coupler 30 may exhibit greater diffraction efficiency when diffracting light of a given linear polarization and/or light of a given linear polarization may serve to minimize the production of unsightly "light saber" optical artifacts in waveguide 26. In some scenarios, a linear polarizer is optically interposed between display module 14A and input coupler 28 to convert unpolarized image light produced by display module 14A into linearly polarized light that is coupled into waveguide 26. However, if care is not taken, the linear polarizer may remove as much as half of the image light from the optical path between display module 14A and eye box 24. This may undesirably decrease the total amount of light that reaches eye box 24 for presenting images to a user. In one suitable arrangement that is described herein as an example, optical system 14B may include polarization recycling structures that mitigate this light loss while also providing light of a single linear polarization to output coupler 30 (thereby maximizing the optical efficiency of the display).

Figure 3:
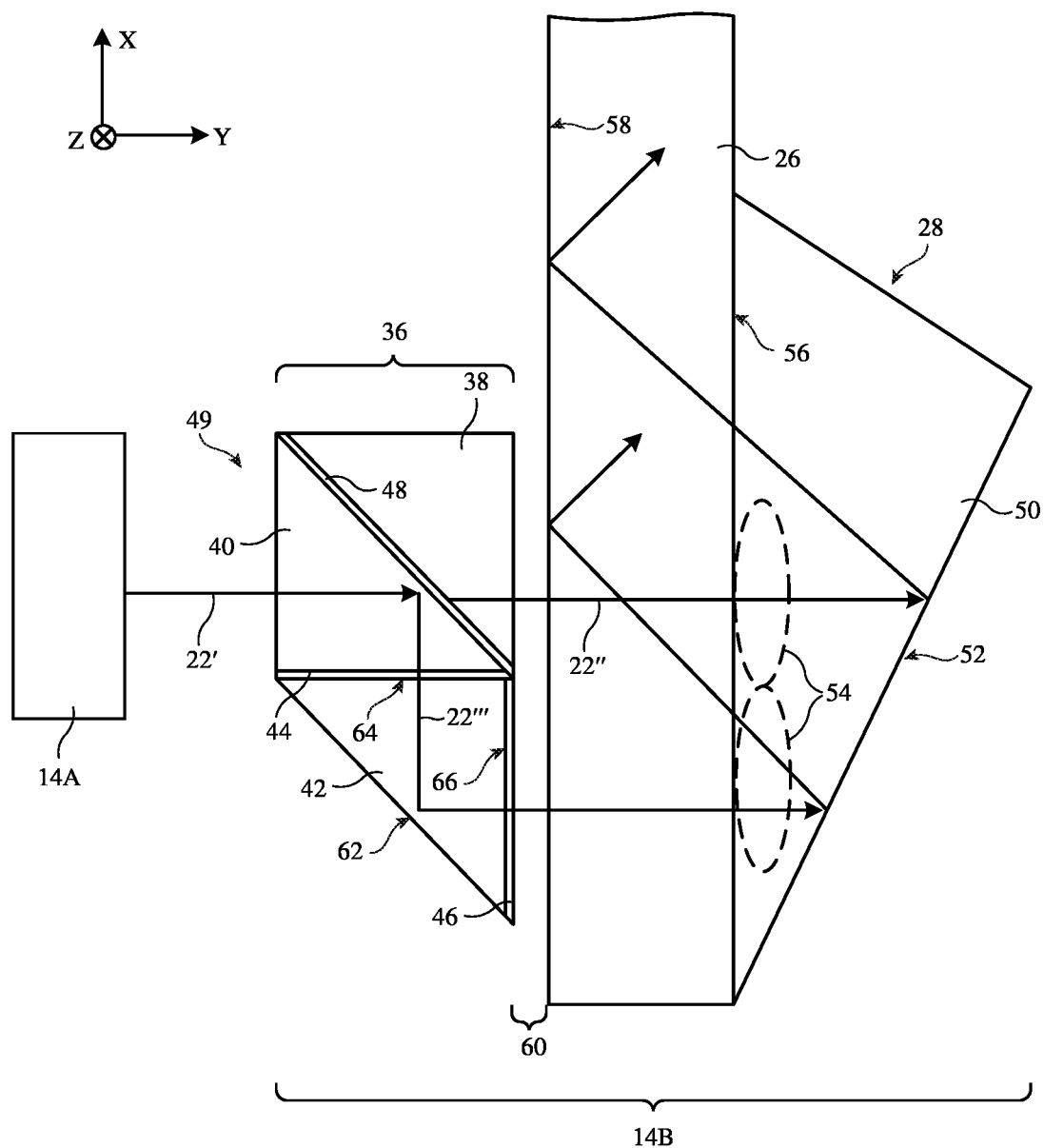
FIG. 3 is bottom view of illustrative polarization recycling structures that pass light of a given polarization to a reflective input coupling prism in accordance with some embodiments.

FIG. 3 is a bottom view showing how optical system 14B may include polarization recycling structures. As shown in FIG. 3, input coupler 28 may include an input coupling prism such as input coupling prism 50. In the example of FIG. 3, input coupling prism 50 is a reflective input coupling prism. This is merely illustrative and, in general, input coupler 28 may include other input coupling structures.

Waveguide 26 may have a first lateral waveguide surface such as waveguide surface 56. Waveguide 26 may have a second lateral waveguide surface such as waveguide surface 58 that opposes waveguide surface 56. Waveguide surfaces 56 and 58 may extend parallel to each other. Waveguide surface 56 and/or waveguide surface 58 may be planar or may be curved. In the example of FIG. 3, input coupling prism 50 is mounted to waveguide surface 56 (e.g., using optically clear adhesive). Input coupling prism 50 has a reflective surface 52 that reflects image light from display module 14A into waveguide 26 at angles such that the image light can propagate down waveguide 26 via total internal reflection (e.g., reflective surface 52 may reflect the image light into waveguide 26 at angles within the total internal reflection (TIR) range of waveguide 26). If desired, a reflective coating may be layered onto some or all of reflective surface 52 to help reflect the image light into waveguide 26. Portions of reflective surface 52 that do not receive incident image light (e.g., portions of reflective surface 52 that do not overlap pupils of the image light) may be covered with an optical absorber if desired.

Display module 14A may emit image light such as image light 22'. Image light 22' may be unpolarized and may therefore sometimes be referred to herein as unpolarized image light 22'. Optical system 14B may include polarization recycling structures such as polarization recycling structures 36. Polarization recycling structures 36 may be optically interposed between display module 14A and input coupler 28 (e.g., at a location along the optical path between display module 14A and waveguide surface 58). Polarization recycling structures 36 may be mounted to waveguide surface 58 (e.g., using optically clear adhesive) or may be separated from waveguide 26 by an optional air gap such as air gap 60.

Polarization recycling structures 36 may convert unpolarized image light 22' into linearly polarized image light. The linearly polarized image light may have a single linear polarization to maximize the optical efficiency of waveguide 26. Providing image light of a single polarization may also serve to minimize the production of unsightly light saber artifacts along waveguide 26. Polarization recycling structures 36 may perform polarization recycling operations that serve to minimize the amount of unpolarized image light 22' that is removed from the optical path, thereby maximizing the total amount of image light that is provided to the eye box by optical system 14B.

As shown in FIG. 3, polarization recycling structures 36 may include a polarizing beam splitter such as polarizing beam splitter 49. Polarizing beam splitter 49 may include a reflective polarizer such as reflective polarizer 48. Reflective polarizer 48 may be formed from a layer or coating that is interposed or sandwiched between optical wedge 40 and optical wedge 38. Optical wedges 38 and 40 may sometimes also be referred to herein as prisms.

Polarizing beam splitter 49 may receive unpolarized image light 22' from display module 14A. Polarizing beam splitter 49 may convert unpolarized image light 22' into image light 22" having a first linear polarization and image light 22''' having a second linear polarization. The second linear polarization may be orthogonal to the first linear polarization. For example, reflective polarizer 48 may transmit the portion of unpolarized image light 22' having the first linear polarization, as image light 22", while also reflecting the portion of unpolarized image light 22' having the second linear polarization, as image light 22'. In a first suitable arrangement, the image light 22" produced by polarizing beam splitter 49 is s-polarized light whereas the image light 22''' produced by polarizing beam splitter 49 is p-polarized light. In a second suitable arrangement, the image light 22" produced by polarizing beam splitter 49 is p-polarized light whereas image light 22' produced by polarizing beam splitter 49 is s-polarized light.

Polarizing beam splitter 49 may transmit image light 22" to reflective surface 52 of input coupling prism 50 (e.g., through waveguide 26). If only image light 22" were to be used to convey images to the output coupler, only about half of the image light produced by display module 14A would be provided to the output coupler. Polarization recycling structures 36 may therefore perform polarization recycling operations to maximize the amount of image light that is provided to the output coupler and thus to the eye box.

For example, polarization recycling structures may include an additional optical wedge such as optical wedge 42. Optical wedge 42 may sometimes be referred to herein as prism 42. Prism 42 may have a first surface 64, a second surface 66, and a reflective surface 62 that extends from first surface 64 to second surface 66. Second surface 66 may extend perpendicular to first surface 64. First surface 64 may be mounted to prism 40 in polarizing beam splitter 49. Second surface 66 may be mounted to waveguide surface 58 or may be separated from waveguide surface 58 by air gap 60. Air gap 60 may help to preserve the total internal reflection condition of the image light (e.g., to allow the image light to be coupled into the waveguide at angles suitable for total internal reflection). A first quarter waveplate such as quarter waveplate 44 may be layered onto first surface 64 or may otherwise be optically interposed between prism 40 and prism 42. A second quarter waveplate such as quarter waveplate 46 may be layered onto second surface 66 or may otherwise be optically interposed between prism 42 and waveguide 26. In another suitable arrangement, quarter waveplates 44 and 46 may be replaced by a single half waveplate that is layered onto either first surface 64 or second surface 66 of prism 42.

Quarter waveplate 44 may receive the image light 22''' having the second linear polarization that was reflected by reflective polarizer 48. Quarter waveplate 44 may convert the polarization of image light 22''' from the second linear polarization to a circular polarization having a first direction. The image light 22''' transmitted by quarter waveplate 44 (e.g., having the circular polarization in the first direction) may reflect off of reflective surface 62 of prism 42. This reflection may reverse the polarization direction of image light 22'''. The reflected image light 22''' may then pass through quarter waveplate 46. After passing through quarter waveplate 46, image light 22''' may have the same linear polarization as image light 22" (e.g., image light 22''' may have the first linear polarization upon entering waveguide 26). In another suitable arrangement, image light 22' may pass through a single half waveplate on either first surface 64 or second surface 66 of prism 42. The half wave plate may perform the same operation on image light 22''' that is otherwise performed collectively by both quarter waveplates 44 and 46. Reflective surface 52 of input coupling prism 50 may reflect both image light 22" and image light 22' (e.g., image light having the first linear polarization) into waveguide 26 (e.g., at angles within the TIR range of the waveguide). Image light 22" and image light 22''' may collectively form image light 22 of FIG. 2.

In this way, polarization recycling structures 36 may effectively double the amount of image light provided to waveguide 26 relative to scenarios where only a polarizing beam splitter is used to provide image light of the first linear polarization to the waveguide. This may serve to maximize the amount of image light provided to the output coupler and the eye box, while also maximizing the optical efficiency of optical system 14B and mitigating the formation of light saber artifacts along waveguide 26. Image light 22" and image light 22''' may each be incident upon reflective surface 52 within respective pupils 54. Because image light 22''' is laterally offset from image light 22" upon exiting polarization recycling structures 36, pupils 54 may also be laterally offset with respect to each other at reflective surface 52. In other words, polarization recycling structures 36 may effectively perform pupil replication for the image light, which may serve to reduce image gap and thereby increase the overall uniformity of the image light provided to the eye box.

The example of FIG. 3 is merely illustrative. If desired, polarization recycling structures 36 may be mounted to or integrated within display module 14A. Input coupling prism 50 may have a rectangular shape if desired. In scenarios where input coupling prism 50 has a rectangular shape, air gap 60 may be omitted if desired. One or more surfaces of prisms 38, 40, and/or 42 may be curved to impart optical power to the image light provided to input coupling prism 50. If desired, reflective surface 52 of input coupling prism 50 may be curved to impart optical power to the image light. One or more surfaces of waveguide 26 may additionally or alternatively be curved to impart optical power to the image light if desired. The example of FIG. 3 in which input coupling prism 50 is a reflective input coupling prism is merely illustrative. In another suitable arrangement, input coupling prism 50 may be a transmissive input coupling prism.

Figure 4:
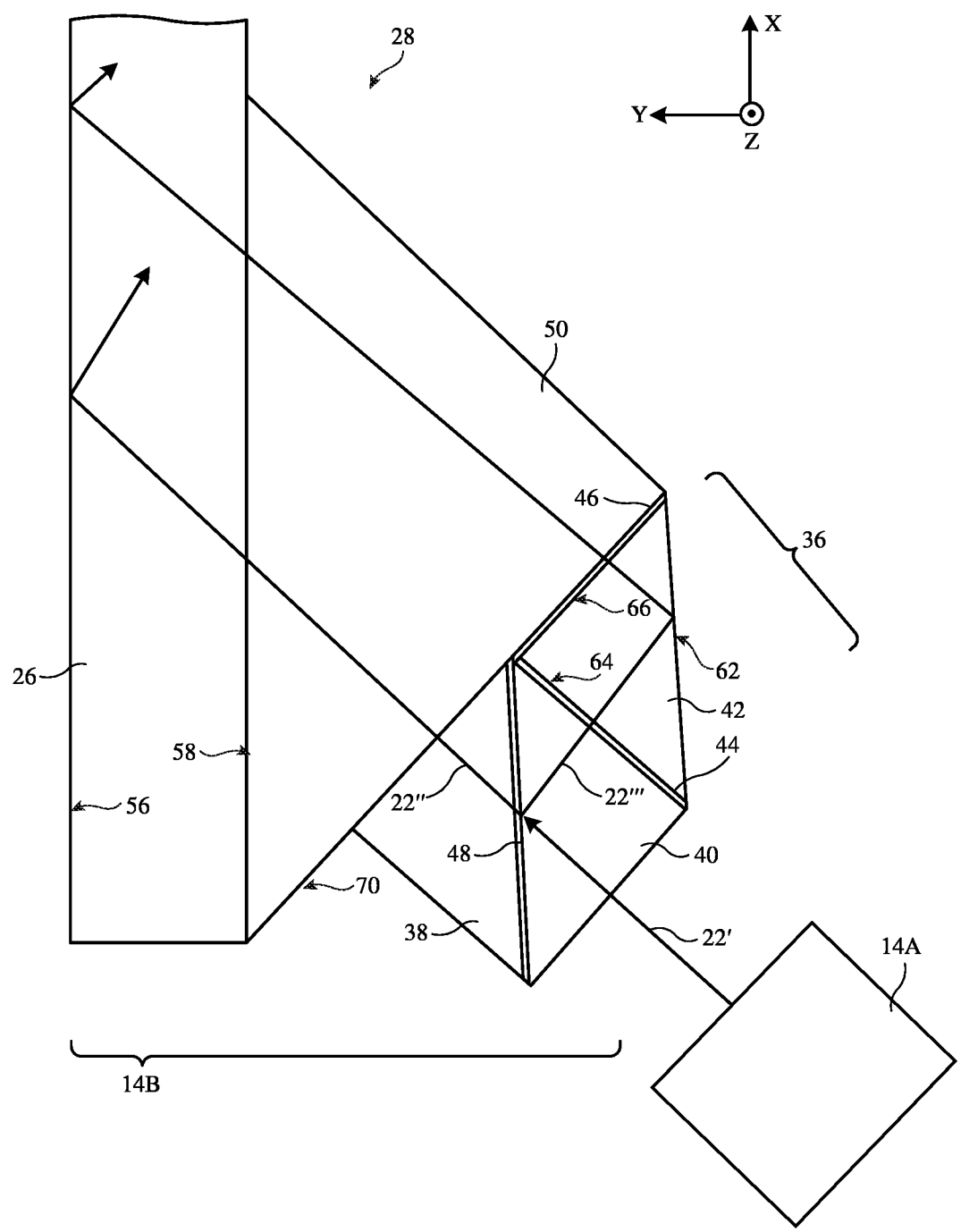
FIG. 4 is a top view of illustrative polarization recycling structures that pass light of a given polarization to a transmissive input coupling prism in accordance with some embodiment.

FIG. 4 is a top view showing how polarization recycling structures 36 may be used to provide polarized image light to input coupling prism 50 in examples where input coupling prism 50 is a transmissive input coupling prism. As shown in FIG. 4, input coupling prism 50 may be mounted to waveguide surface 58 (e.g., the lateral surface of waveguide 26 facing display module 14A). Input coupling prism 50 may have an angled transmissive surface 70 facing display module 14A. Polarization recycling structures 36 may be mounted to transmissive surface 70 (e.g., using optically clear adhesive). For example, prism 38 and second surface 66 of prism 42 may be coupled to transmissive surface 70 of input coupling prism 50. Quarter waveplate 46 (or a half waveplate in scenarios where quarter waveplates 44 and 46 are omitted) may be optically interposed, sandwiched, or layered between prism 42 and transmissive surface 70. In another suitable arrangement, an air gap may be interposed between polarization recycling structures 36 and transmissive surface 70 and/or polarization recycling structures 36 may be mounted to or integrated within display module 14A.

Polarization recycling structures 36 may convert unpolarized image light 22' from display module 14A into image light 22" and image light 22''' having the same linear polarization. Image light 22" and 22''' may be transmitted through transmissive surface 70 of input coupling prism 50. Input coupling prism 50 may couple image light 22" and 22''' into waveguide 26 within the TIR range of waveguide 26. In this way, polarization recycling structures 36 may effectively double the amount of image light provided to waveguide 26 relative to scenarios where only a polarizing beam splitter is used to provide image light of the first linear polarization to the waveguide. This may serve to maximize the amount of image light provided to the output coupler and the eye box, while also maximizing the optical efficiency of optical system 14B and mitigating the formation of light saber artifacts along waveguide 26.

Figure 5:
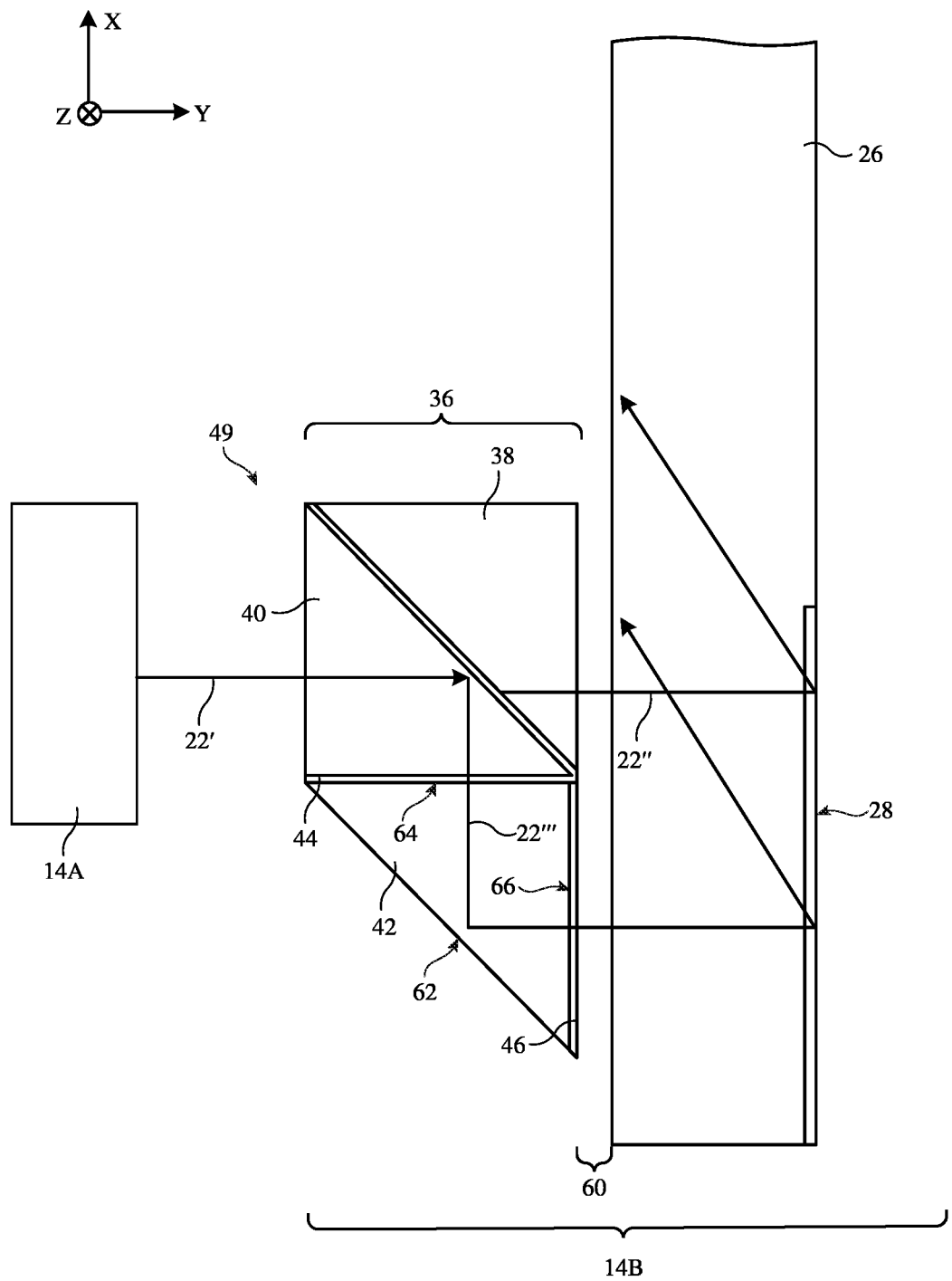
FIG. 5 is a top view showing how illustrative polarization recycling structures may pass light of a given polarization to a non-prism input coupler in accordance with some embodiments.

In the example of FIGS. 3 and 4, input coupler 28 is an input coupling prism. This is merely illustrative. If desired, input coupler 28 may include a non-prism input coupler, as shown in FIG. 5. Input coupler 28 of FIG. 5 may include, for example, one or more surface relief gratings (SRGs), one or more louvered mirrors, or other diffractive and/or reflective structures layered onto a surface of waveguide 26 and/or embedded within waveguide 26. Forming input coupler 28 using a surface relief grating may, for example, establish substantial flexibility to create a larger pupil without an overall increase in the volume of display module 14A (e.g., in scenarios where display module 14A is implemented using a DLP or uLED architecture) relative to examples where an input coupling prism is used.

Figure 6:
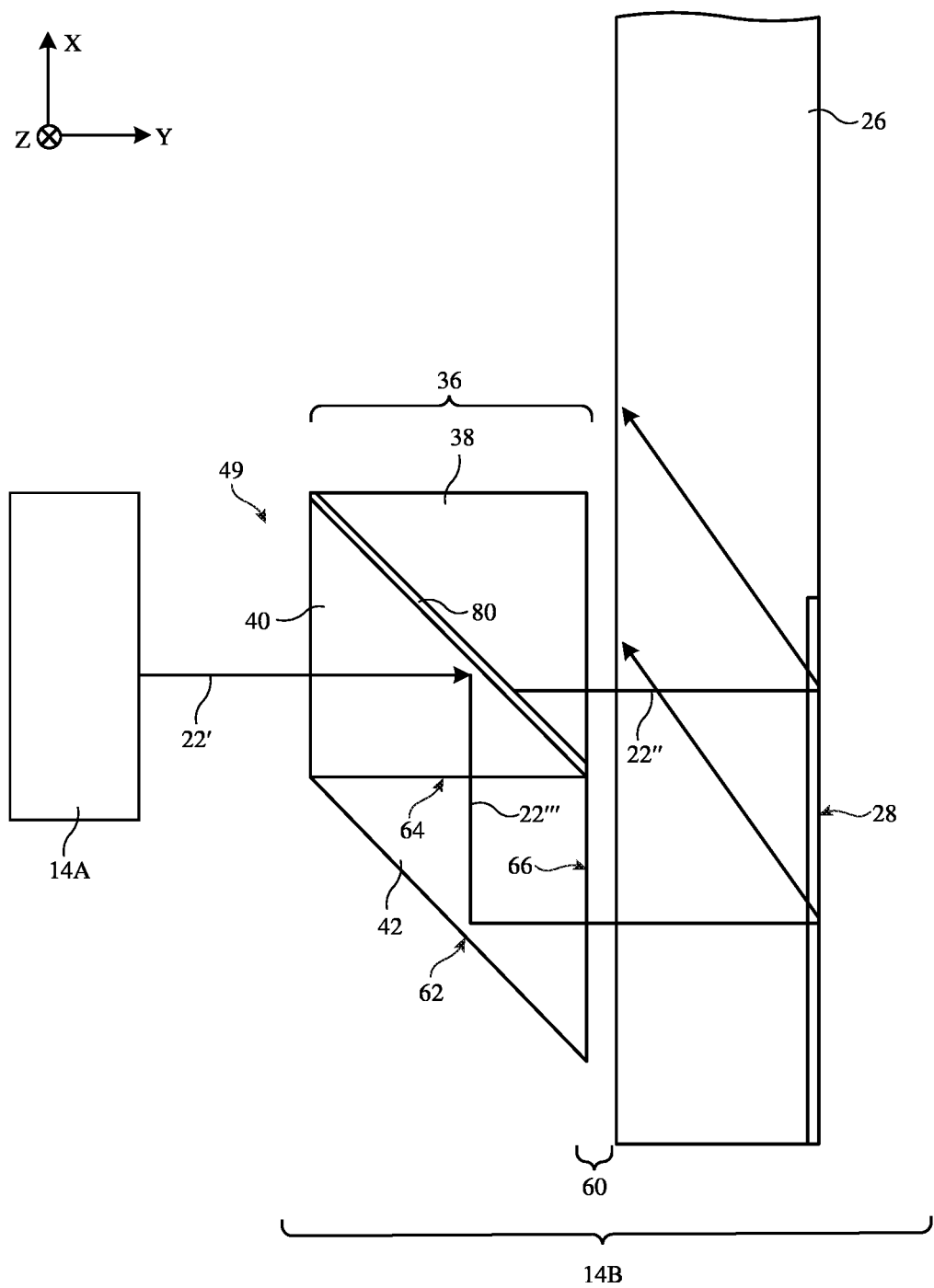
FIG. 6 is a top view showing how polarization recycling structures may be replaced by an illustrative non-polarizing beam splitter in accordance with some embodiments.

The examples of FIGS. 3-5 in which reflective polarizer 48 is sandwiched between prisms 38 and 40 is merely illustrative. In another suitable arrangement, as shown in FIG. 6, reflective polarizer 48 may be replaced with a non-polarizing beam splitter such as beam splitter 80. Beam splitter 80 may be, for example, a 50-50 beam splitter that transmits half of image light 22' as image light 22" and that reflects the other half of image light 22' as image light 22". In this example, quarter waveplates 44 and 46 (or a single half waveplate in scenarios where a half waveplate replaces quarter waveplates 44 and 46 of FIGS. 3-5) may be omitted. This may configure structures 36 to perform pupil replication upon input coupling into waveguide 26 without affecting the polarization state of the image light, particularly in examples where display module 14A is implemented using a DLP, uLED, or ferroelectric liquid crystal on silicon (fLCOS) architecture. The example of FIG. 6 in which beam splitter 80 provides image light to a non-prism input coupler is merely illustrative. The non-prism input coupler 28 of FIG. 6 may be replaced with an input coupling prism if desired (e.g., as shown in FIGS. 3 and 4).

In accordance with an embodiment, a display system is provided that includes a waveguide; an input coupling prism mounted to the waveguide; a polarizing beam splitter, the polarizing beam splitter is configured to transmit a first portion of unpolarized image light as first image light having a first polarization and is configured to reflect a second portion of the unpolarized image light as second image light having a second polarization; a prism having a reflective surface; a first quarter waveplate optically interposed between the prism and the polarizing beam splitter; and a second quarter waveplate optically interposed between the prism and the waveguide, the first quarter waveplate is configured to transmit the second image light, the reflective surface is configured to reflect the second image light after transmission by the first quarter waveplate, the second quarter waveplate is configured to transmit the second image light after reflection by the reflective surface, and the input coupling prism is configured to couple the first and second image light into the waveguide.

In accordance with another embodiment, the second image light has the first polarization after transmission by the second quarter waveplate.

In accordance with another embodiment, the display system includes an output coupler on the waveguide, the output coupler is configured to couple the first and second image light out of the waveguide.

In accordance with another embodiment, the output coupler includes holograms.

In accordance with another embodiment, the input coupling prism has an additional reflective surface that is configured to receive the first and second image light through the waveguide and that is configured to reflect the first and second image light into the waveguide.

In accordance with another embodiment, the display system includes an air gap between the polarizing beam splitter and the waveguide and between the prism and the waveguide.

In accordance with another embodiment, the input coupling prism has a transmissive surface that is configured to receive the first and second image light and that is configured to transmit the first and second image light into the waveguide.

In accordance with another embodiment, the polarizing beam splitter and the prism are mounted to the transmissive surface of the input coupling prism.

In accordance with another embodiment, the polarizing beam splitter includes a first additional prism, a second additional prism, and a reflective polarizer interposed between the first and second additional prisms, the first quarter waveplate being optically interposed between the prism and the first additional prism.

In accordance with an embodiment, a display system is provided that includes a waveguide; an input coupling prism mounted to the waveguide; a polarizing beam splitter, the polarizing beam splitter is configured to transmit a first portion of unpolarized image light as first image light having a first polarization and is configured to reflect a second portion of the unpolarized image light as second image light having a second polarization; a prism having a reflective surface; and a half waveplate coupled to the prism, the second image light is configured to reflect off of the reflective surface of the prism, the half waveplate is configured to transmit the second image light, and the input coupling prism is configured to couple the first and second image light into the waveguide.

In accordance with another embodiment, the prism has a first surface and a second surface orthogonal to the first surface, the reflective surface extends from the first surface to the second surface, the first surface is coupled to the polarizing beam splitter, and the first and second surfaces are configured to transmit the second image light.

In accordance with another embodiment, the half waveplate is layered on the first surface of the prism.

In accordance with another embodiment, the half waveplate is layered on the second surface of the prism.

In accordance with another embodiment, the display system includes an output coupler on the waveguide, the output coupler is configured to couple the first and second image light out of the waveguide and the output coupler includes volume holograms.

In accordance with another embodiment, the input coupling prism has an additional reflective surface that is configured to receive the first and second image light through the waveguide, the first and second image light both have the first polarization when received at the additional reflective surface, and the additional reflective surface is configured to reflect the first and second image light into the waveguide.

In accordance with another embodiment, the display system includes an air gap between the polarizing beam splitter and the waveguide and between the prism and the waveguide.

In accordance with another embodiment, the input coupling prism has a transmissive surface that is configured to receive the first and second image light, the first and second image light both have the first polarization when received at the transmissive surface, and the transmissive surface is configured to transmit the first and second image light into the waveguide.

In accordance with another embodiment, the polarizing beam splitter and the prism are mounted to the transmissive surface of the input coupling prism.

In accordance with an embodiment, an electronic device is provided that includes a display module configured to produce unpolarized image light; a waveguide having an output coupler; a first prism; a second prism; a reflective polarizer interposed between the first and second prisms, the reflective polarizer is configured to receive the unpolarized image light through the first prism, is configured to transmit a first portion of the unpolarized image light as first image light having a first linear polarization, and is configured to reflect a second portion of the unpolarized image light as second image light having a second linear polarization orthogonal to the first linear polarization; a third prism coupled to the first prism, the third prism is configured to receive the second image light through the first prism and is configured to reflect the second image light towards the waveguide; a waveplate coupled to the third prism and configured to transmit the second image light; and an input coupler on the waveguide, the input coupler is configured to receive the first and second image light, the first and second image light both have the first linear polarization upon receipt by the input coupler, the input coupler is configured to couple the first and second image light into the waveguide, and the output coupler is configured to couple the first and second image light out of the waveguide.

In accordance with another embodiment, the electronic device includes an additional waveplate coupled to the third prism and configured to transmit the second image light, the waveplate includes a first quarter waveplate and the additional waveplate includes a second quarter waveplate.

In accordance with another embodiment, the input coupler includes an input coupler selected from the group consisting of: an input coupling prism, a surface relief grating, and a louvered mirror.

In accordance with an embodiment, an electronic device is provided that includes a display module configured to produce image light; a waveguide having an output coupler; a first prism; a second prism; a beam splitter interposed between the first and second prisms, the beam splitter is configured to receive the image light through the first prism, is configured to transmit a first portion of the image light as first image light, and is configured to reflect a second portion of the image light as second image light; a third prism coupled to the first prism, the third prism is configured to receive the second image light through the first prism and is configured to reflect the second image light towards the waveguide; and an input coupler on the waveguide, the input coupler is configured to receive the first and second image light, the input coupler is configured to couple the first and second image light into the waveguide, and the output coupler is configured to couple the first and second image light out of the waveguide.

In accordance with another embodiment, the input coupler includes an input coupler selected from the group consisting of: an input coupling prism, a surface relief grating, and a louvered mirror.

The foregoing is merely illustrative and various modifications can be made to the described embodiments. The foregoing embodiments may be implemented individually or in any combination.

What is claimed is:

1. A display system comprising:
   a waveguide;
   an input coupling prism mounted to the waveguide;
   a polarizing beam splitter, wherein the polarizing beam splitter is configured to transmit a first portion of unpolarized image light as first image light having a first polarization and is configured to reflect a second portion of the unpolarized image light as second image light having a second polarization;
   a prism having a reflective surface;
   a first quarter waveplate optically interposed between the prism and the polarizing beam splitter; and
   a second quarter waveplate optically interposed between the prism and the waveguide, wherein the first quarter waveplate is configured to transmit the second image light, the reflective surface is configured to reflect the second image light after transmission by the first quarter waveplate, the second quarter waveplate is configured to transmit the second image light after reflection by the reflective surface, and the input coupling prism is configured to couple the first and second image light into the waveguide.

2. The display system of claim 1, wherein the second image light has the first polarization after transmission by the second quarter waveplate.

3. The display system of claim 2, further comprising:
   an output coupler on the waveguide, wherein the output coupler is configured to couple the first and second image light out of the waveguide.

4. The display system of claim 3, wherein the output coupler comprises holograms.

5. The display system of claim 1, wherein the input coupling prism has an additional reflective surface that is configured to receive the first and second image light through the waveguide and that is configured to reflect the first and second image light into the waveguide.

6. The display system of claim 5, further comprising an air gap between the polarizing beam splitter and the waveguide and between the prism and the waveguide.

7. The display system of claim 1, wherein the input coupling prism has a transmissive surface that is configured to receive the first and second image light and that is configured to transmit the first and second image light into the waveguide.

8. The display system of claim 7, wherein the polarizing beam splitter and the prism are mounted to the transmissive surface of the input coupling prism.

9. The display system of claim 1, wherein the polarizing beam splitter comprises a first additional prism, a second additional prism, and a reflective polarizer interposed between the first and second additional prisms, the first quarter waveplate being optically interposed between the prism and the first additional prism.

10. A display system comprising:
  a waveguide;
  an input coupling prism mounted to the waveguide;
  a polarizing beam splitter, wherein the polarizing beam splitter is configured to transmit a first portion of unpolarized image light as first image light having a first polarization and is configured to reflect a second portion of the unpolarized image light as second image light having a second polarization;
  a prism having a reflective surface; and
  a half waveplate coupled to the prism, wherein the second image light is configured to reflect off of the reflective surface of the prism, the half waveplate is configured to transmit the second image light, and the input coupling prism is configured to couple the first and second image light into the waveguide.

11. The display system of claim 10, wherein the prism has a first surface and a second surface orthogonal to the first surface, the reflective surface extends from the first surface to the second surface, the first surface is coupled to the polarizing beam splitter, and the first and second surfaces are configured to transmit the second image light.

12. The display system of claim 11, wherein the half waveplate is layered on the first surface of the prism.

13. The display system of claim 11, wherein the half waveplate is layered on the second surface of the prism.

14. The display system of claim 10, further comprising:
  an output coupler on the waveguide, wherein the output coupler is configured to couple the first and second image light out of the waveguide and wherein the output coupler comprises volume holograms.

15. The display system of claim 10, wherein the input coupling prism has an additional reflective surface that is configured to receive the first and second image light through the waveguide, the first and second image light both have the first polarization when received at the additional reflective surface, and the additional reflective surface is configured to reflect the first and second image light into the waveguide.

16. The display system of claim 15, further comprising an air gap between the polarizing beam splitter and the waveguide and between the prism and the waveguide.

17. The display system of claim 10, wherein the input coupling prism has a transmissive surface that is configured to receive the first and second image light, the first and second image light both have the first polarization when received at the transmissive surface, and the transmissive surface is configured to transmit the first and second image light into the waveguide.

18. The display system of claim 17, wherein the polarizing beam splitter and the prism are mounted to the transmissive surface of the input coupling prism.

19. An electronic device comprising:
  a display module configured to produce unpolarized image light;
  a waveguide having an output coupler;
  a first prism;
  a second prism;
  a reflective polarizer interposed between the first and second prisms, wherein the reflective polarizer is configured to receive the unpolarized image light through the first prism, is configured to transmit a first portion of the unpolarized image light as first image light having a first linear polarization, and is configured to reflect a second portion of the unpolarized image light as second image light having a second linear polarization orthogonal to the first linear polarization;
  a third prism coupled to the first prism, wherein the third prism is configured to receive the second image light through the first prism and is configured to reflect the second image light towards the waveguide;
  a waveplate coupled to the third prism and configured to transmit the second image light; and
  an input coupler on the waveguide, wherein the input coupler is configured to receive the first and second image light, the first and second image light both have the first linear polarization upon receipt by the input coupler, the input coupler is configured to couple the first and second image light into the waveguide, and the output coupler is configured to couple the first and second image light out of the waveguide.

20. The electronic device of claim 19, further comprising:
  an additional waveplate coupled to the third prism and configured to transmit the second image light, wherein the waveplate comprises a first quarter waveplate and the additional waveplate comprises a second quarter waveplate.

21. The electronic device of claim 19, wherein the input coupler comprises an input coupler selected from the group consisting of: an input coupling prism, a surface relief grating, and a louvered mirror.

22. An electronic device comprising:
  a display module configured to produce image light;
  a waveguide having an output coupler;
  a first prism;
  a second prism;
  a beam splitter interposed between the first and second prisms, wherein the beam splitter is configured to receive the image light through the first prism, is configured to transmit a first portion of the image light as first image light, and is configured to reflect a second portion of the image light as second image light;
  a third prism coupled to the first prism, wherein the third prism is configured to receive the second image light through the first prism and is configured to reflect the second image light towards the waveguide; and
  an input coupler on the waveguide, wherein the input coupler is configured to receive the first and second image light, the input coupler is configured to couple the first and second image light into the waveguide, and the output coupler is configured to couple the first and second image light out of the waveguide.

23. The electronic device of claim 22, wherein the input coupler comprises an input coupler selected from the group consisting of: an input coupling prism, a surface relief grating, and a louvered mirror.

\* \* \* \* \*